MULTIPHASE POWER FAILURE DETECTION CIRCUIT

Filed June 14, 1968

*INVENTORS*
WILLIAM L. JUMP
JACK L. QUANSTROM

BY Otto Schmid, Jr.
ATTORNEY

United States Patent Office 3,546,537

Patented Dec. 8, 1970

3,546,537

MULTIPHASE POWER FAILURE DETECTION CIRCUIT

William L. Jump and Jack L. Quanstrom, San Jose, Calif., assignors to International Business Machines Corporation, Armonk, N.Y., a corporation of New York Filed June 14, 1968, Ser. No. 737,048
Int. Cl. H02h 3/24; H01h 47/18
U.S. Cl. 317—31 9 Claims

ABSTRACT OF THE DISCLOSURE

A power failure detection circuit is provided whose characteristics can be set to match the system failure characteristics of the associated system. The circuit comprises branches coupled across two phases of the input power system. Each branch circuit comprises a transformer and a full wave rectifier the output of which is coupled to a level setting potentiometer, an RC response shaping network and to the emitter of a unijunction transistor. The unijunction transistor functions as a level detecting means, and an output to a utilization circuit is produced when the voltage at the emitter of the unijunction transistor exceeds a predetermined level. The characteristics of each branch circuit are set by disconnecting the utilization circuit, adjusting a potentiometer placed across the transformer secondary to reduce the effective input voltage to the desired detection level, adjusting the level setting potentiometer until the unijunction transistor just starts conducting, removing the AC input voltage, and measuring the rate of the resultant oscillation at the emitter of the unijunction transistor and, setting the response potentiometer for the period corresponding to the desired time-to-detection response based on the mathematical relation between voltage ratio and the time constant of the response circuit.

BACKGROUND OF INVENTION

This invention relates to voltage sensing circuits and more specifically to a circuit for detecting a primary alternating current power failure exceeding specified limits.

This circuit is particularly useful in a computing or process control system since such systems have a need for protection against the effects of unanticipated power losses. Such systems have sufficient stored energy in their power supplies to continue operation for a substantial time following a partial or total loss of primary power and, if warned of a power failure soon enough, the computer has time to execute instructions necessary to preserve the information stored in main storage and registers and to insure an orderly transition into a power off routine to put the system in a state capable of recovering from the power loss with a minimum of inconvenience. On the other hand, it is highly essential to minimize interruptions due to transient power line disturbances.

DESCRIPTION OF PRIOR ART

Prior art power failure detection circuits utilize a device for sensing a specified under voltage level and a time delay mechanism that is operable to signal a power failure to the system unless the voltage level returns to the rated value during the time delay period. These circuits result in an overly sensitive system which may result in a power off indication when it is not necessary from the standpoint of system operation. It has been shown that the typical computer system failure characteristics when plotted as time to failure vs. percent power sag approximates the characteristics of an exponential curve. It is, therefore, a primary object of this invention to provide a power failure detection circuit whose response characteristics can be matched to the system failure characteristics.

It is another object of this invention to provide a power failure detect circuit that can be easily set to a predetermined response characteristic.

SUMMARY OF THE INVENTION

According to the invention there is provided a power failure detection circuit including a separate parallel branch for each pair of phases. Each branch comprises means for producing a unidirectional voltage proportional to the voltage amplitude of the power system. The unidirectional voltage is coupled to a level setting network which produces the input voltage for a response shaping network designed to provide predetermined response characteristics, and a level detecting means which is operative to generate an alarm signal in response to a voltage from the response shaping network exceeding a predetermined level.

The foregoing and other objects, features and advantages of the invention will be apparent from the following more particular description of a preferred embodiment of the invention as illustrated in the accompanying drawings.

DESCRIPTION OF A PREFERRED EMBODIMENT

The power failure detection circuit is applicable to all types of power systems. The detection circuit is normally coupled across two adjacent phases of the power input system so that an n-phase system can be effectively monitored by $n-1$ parallel detection circuits connected to a single output circuit. If desired, the detection circuit can be coupled from phase to ground in which case $n$ parallel detection circuits are required. In a multiphase system the parallel circuits increase the detection probability in the event of simultaneous loss of more than one phase.

Figure 1:
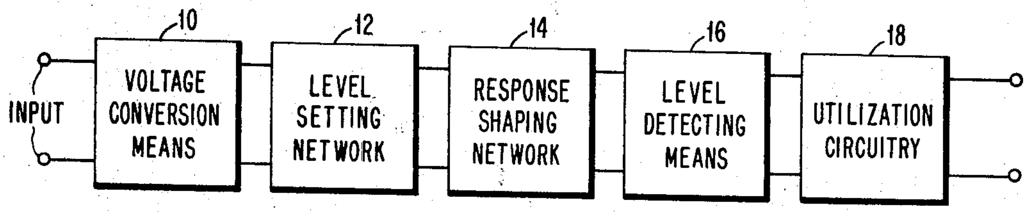
FIG. 1 shows a schematic block diagram of a power failure detection circuit embodying the invention.

A schematic block diagram of one of the detection circuits is shown in FIG. 1. The input from the power system is coupled to a means 10 which functions to produce a unidirectional voltage proportional to the voltage amplitude of the power system. The output of input voltage means 10 is coupled to a level setting network 12 which is easily adjustable to produce in conjunction with a response shaping network 14 a predetermined response characteristic for the circuit. The output from the response shaping network is coupled to level detecting means 16 and this output is operable to produce an output from level detecting means 16 when the output from the response shaping network reaches a predetermined level. The output of level detecting means is then coupled to utilization circuit means 18 which performs the desired system operations in response to the power loss warning signal.

The level detecting means is chosen to have a high input impedance in its off state. Because of this factor, coupled with the relatively low output impedance of the input voltage means and level setting network 12, the transient and frequency characteristics of response shaping network 14 are determined to a high degree by its passive components. The range of the level setting network 12 is designed so that the peak amplitude of the output from the input circuit means is many times greater than the voltage level at the input of the response shaping network 14. The response shaping network is designed to provide a high degree of filtering to eliminate the AC component so that the output response to changes in AC input level are substantially the same as the response to a DC input signal. For this reason the rate of the change at the output of the response shaping network in response to a drop in the input level is directly related to the magnitude of the change in the input level. Thus, the time to respond to a small power fluctuation is greater than the time to detect a total abrupt loss in power. Since this operation corresponds closely to the failure characteristics of a typical computing system, it can be seen that a circuit is provided which has characteristics which closely parallel system failure characteristics in a power loss environment. These characteristics provide adequate protection to a computer system without producing excessive sensitivity to momentary power disturbances which may result in unnecessary system interruption. It is shown below that the circuit can readily be set to produce any desired response characteristics.

Figure 2:
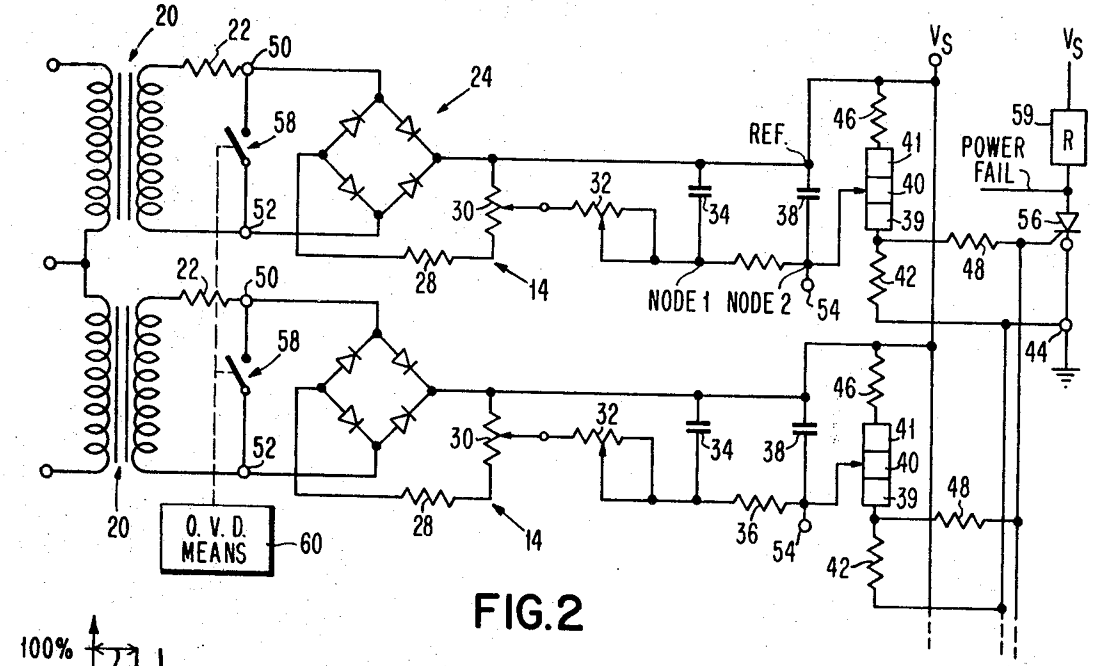
FIG. 2 shows a specific embodiment of the power failure detection circuit applied to a three-phase power system.

A specific embodiment of the power failure detection circuit comprising the invention coupled to monitor a three-phase power system is shown in FIG. 2. The input across two phases of the power system is coupled to the primary of a transformer 20 which has a turns ratio suitable for producing the desired voltage at the secondary winding. In series with the secondary winding is a current limiting resistor and a full-wave diode bridge rectifier 24 is coupled across the secondary of the transformer. These components function to provide a unidirectional voltage proportional to the input voltage. Across the rectifier a level setting network 12 is coupled. The level setting network shown comprises a fixed resistor 28 in series with a variable resistor 30. Variable resistor 30 provides a means for selecting a voltage representative of a fraction of the input voltage.

The selected voltage is provided as an input to a response shaping network. In the embodiment shown, the response shaping network comprises a two-stage RC network. The input signal from the level setting network is coupled to a variable resistor 32 and a capacitor 34 is coupled between the variable resistor and the end of the level setting variable resistor. A second resistor 36 and a second capacitor 38 are coupled across the signal path. The output from the response shaping network is coupled to a level detecting means.

The level detecting means should be a device which has a stable triggering voltage level, a low current drain and characteristics which are stable with variations in temperature and other factors. The unijunction transistor has the above-stated characteristics and in the embodiment shown the level detecting means comprises a unijunction transistor. Base 39 of the unijunction transistor is coupled through a resistor 42 to a reference potential at terminal 44 and base 41 of the unijunction transistor is coupled through a second resistor 46 to a supply voltage $V_S$. The signal from the response shaping network is coupled to the emitter 40 of the unijunction transistor. The characteristic of the unijunction transistor is that no current flows until the voltage at the emitter reaches a critical value which is some fraction of the supply voltage determined by the characteristics of the transistor. The unijunction transistor then exhibits a negative resistance characteristic and a current flow.

The level detecting circuit shown comprises a relaxation oscillator under power loss conditions. The rectifier and response shaping network convert the AC input to a negative DC voltage which is referenced to the source supplying the unijunction transistor. This voltage at the emitter of the unijunction transistor is sufficient to maintain the emitter reverse biased and, therefore, the transistor is non-conducting. A loss of system input voltage causes capacitor 38 to be discharged through the resistors 30, 32, 36 so that the emitter voltage rises exponentially toward the unijunction transistor supply voltage $V_S$ level at a rate dependent upon the magnitude of the input voltage change. If the change is of sufficient magnitude and duration, the triggering point of the transistor is reached. At this time the emitter becomes forward biased and the dynamic resistance between the emitter and base 39 drops to a low level. The capacitor 38 then charges through the emitter until the emitter voltage reaches its minimum voltage at which time the emitter ceases to conduct and the cycle is repeated. The output of the unijunction transistor at base 39 is a train of pulses, of sufficient amplitude and duration to actuate a suitable utilization circuit. For certain purposes the output of the unijunction transistor can be used directly; in cases where a control is needed in which higher power output is required, the unijunction transistor output is ideally suited for use as a silicon controlled rectifier trigger pulse. For this purpose the signal is coupled through resistor 48 to trigger the silicon controlled rectifier 56. The output of the silicon controlled rectifier then may be used for any desired control purpose such as energization of relay 59, for example. A signal Power Fail may also be generated to provide any desired control functions in the system.

Figure 3:
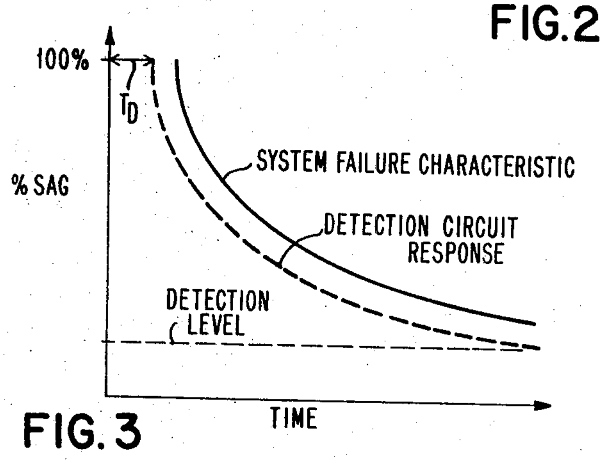
FIG. 3 shows a plot of time vs. percent power line sag for a system time-to-failure response curve and the detection characteristic of the power failure detection circuit embodying the invention.

One of the advantages of the power failure detect circuit is that the circuit can be easily calibrated to produce a wide variety of response characteristics so that the response characteristics of the power failure detect circuit can be matched to the system failure characteristics. As shown in FIG. 3, all points to the right of the solid curve represent system failure conditions. The dotted curve represents the selected power failure detection circuit response characteristics. The desired safe operation time can be chosen by circuit characteristics and this time is represented by the spacing between the curves in FIG. 3. In addition, the power failure detect circuit characteristics can be different for each of the parallel circuits so that different components within the system which have different failure characteristics can be protected separately, depending upon the phase of the source from which they receive power.

The circuit described above has the advantage that few additional components are required to also provide the function of over voltage detection. An over voltage detection means 60 is provided. A switching means 58 is provided across terminals 50, 52 of the detection circuit. Switching means 58 is operable in response to energization of over voltage detection means 60. One suitable over voltage detection means is an over voltage relay which is operable to close a contact upon sensing an over voltage condition. This operation appears to the circuit to be an abrupt power loss with the result that the circuit generates a signal which permits an orderly power down operation to occur before the overvoltage condition causes system failures.

Figure 4:
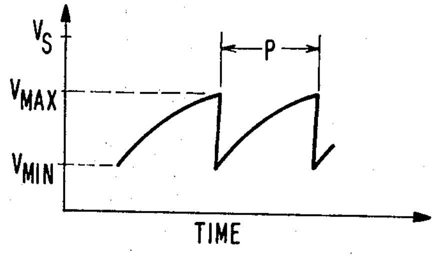
FIG. 4 shows a plot of voltage at the emitter of the unijunction transistor when operating as an oscillatory circuit.

The circuit is calibrated by first disconnecting the output circuit from the unijunction transistor. By means of a potentiometer temporarily connected across terminals 50 and 52 at the secondary of the transformer, reduce the effective input voltage to the selected detection level. The voltage between these points corresponding to the specified percent of power line voltage decrease is easily computed by using the ratio between the voltage measured at these points under normal operation and the measured line voltage. Having adjusted the potentiometer to simulate a specified sag level, adjust the level detection potentiometer 30 to the point at which the unijunction transistor circuit just begins to oscillate. This can be observed by an oscilloscope connected to the test point 54 provided at the emitter of the unijunction transistor. This establishes the detection level of the circuit. Then remove the AC injut from the circuit which causes the circuit to go into oscillation. A relaxation oscillator waveform similar to that shown in FIG. 4 can then be observed on an oscilloscope connected to test point 54 at the emitter of the unijunction transistor. At this time measure $V_{max}$, $V_{min}$ and $V_s$ and compute the voltage ratio, $VR=V_H/V_L$ where $V_H=V_s-V_{min}$ and $V_L=V_s-V_{max}$. It can be shown that for given filter network parameters such as resistance and capacitance, there is a precise mathematical relationship between the period of oscillation when the circuit is free-running and the time it takes the voltage at the emitter to decay to the firing or detection point when the input power is removed abruptly. The relation depends only on the detection level setting and the detection and cutoff points of the transistor as reflected by the ratio VR.

The period of oscillation P is uniquely determined by the ratio $V_H/V_L$ and the value of the passive components $R_1$, $R_2$, $C_1$, $C_2$ using equations of the forms:

$$V_1(t)=A_1 \exp(S_1P)+B_1 \exp(S_2P) \quad (1)$$

$$V_2(t)=A_2 \exp(S_1P)+B_2 \exp(S_2P) \quad (2)$$

where:

$V_1$=voltage between node 1 and ref of FIG. 2 and $V_2$=voltage between node 2 and ref of FIG. 2.

For a given set of fixed circuit parameters $R_1$ is the variable parameter which determines the values of both time to detection or delay $T_D$ and P.

To obtain the value of P corresponding to a given desired value of $T_D$ we proceed as follows:

Solve for the required value of $R_1$ using an equation of the form:

$$V_F=A \exp(S_1T)+B \exp(S_2T) \quad (3)$$

where:

$V_F$ is the final or firing level of $V_2$, A and B are functions of initial value of $V_2$ and the passive components and $S_1$ and $S_2$ are functions of the passive components only.

Using the computed value of $R_1$, measured values of $V_H$ and $V_L$ and the specified values of $R_2$, $C_1$, $C_2$ solve for P.

The indicated solutions can be obtained by application of iterative methods well known in the art.

Figure 5:
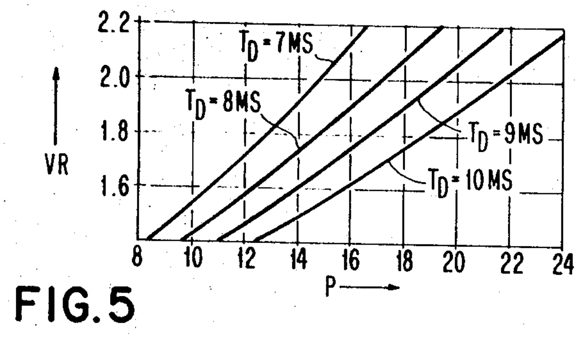
FIG. 5 is a plot showing the relationship between period and time delay with the parameter VR.

Using a computer it is relatively easy to obtain data for a family of curves relating P, $T_D$ and the ratio $V_H/V_L$ such as that shown in FIG. 5.

This relation can be easily computed and represented by a curve or family of curves of period vs. VR with time to detect as the parameter. It is then only necessary to make a simple measurement of the voltage ratio to determine the desired oscillation period from a pre-computed curve. Then, while observing the oscillation waveform, the time constant potentiometer 32 is adjusted to produce the required period. Hence, the only equipment required for accurate calibration are a voltmeter, and oscilloscope and an inexpensive potentiometer. This method completes the calibration of one parallel section of the circuit. Each of the other parallel sections can be calibrated independently by the same procedure.

While the invention has been particularly shown and described with reference to a preferred embodiment thereof, it will be understood by those skilled in the art that various changes in the form and details may be made therein without departing from the spirit and scope of the invention.

What is claimed is:

1. A circuit for detection of power failure in an alternating current system supplying a utilization device having a predetermined operating characteristic in response to a power failure comprising:

means coupled to the input power system for providing a unidirectional voltage proportional to the corresponding input voltage;

means for adjusting the level of said unidirectional voltage;

a level detecting means;

a response shaping network;

means for coupling said response shaping network between said level adjusting means and said level detecting means to provide an input signal to said level detecting means responsive to the characteristics of said response shaping network and said level detecting means;

said level detecting means being responsive to said input signal and the voltage ratio of said level detecting means to produce an alarm signal when the input voltage reaches a failure condition so that the circuit response characteristic matches the system failure characteristic.

2. The power failure detection circuit according to claim 1 wherein said response shaping network comprises a two-stage RC network.

3. The power failure detection circuit according to claim 1 wherein said means for providing a unidirectional voltage proportional to the input voltage comprises a transformer and a full-wave rectifier coupled across the transformer output.

4. The power failure detection circuit as specified in claim 1 further comprising means for generating a system alarm signal in response to the output from said level detecting means.

5. The power failure detection circuit according to claim 4 where said means for generating an alarm signal comprises a silicon controlled rectifier.

6. An over voltage detection circuit comprising the power failure detect circuit as described in claim 1 further comprising an over voltage sensing means and means responsive to said over voltage sensing means for decoupling the input to said level adjusting means.

7. The method of calibrating a power failure detection circuit utilizing a level setting means, a response shaping network and a level detecting means comprising the steps of:

sensing the input voltage to the circuit;

adjusting said level setting means to produce a predetermined fraction of the input voltage;

removing the input voltage;

sensing the maximum and minimum voltages at the input to said level setting circuit;

computing the period of the level setting circuit based on the desired time delay; and adjusting the response shaping network to provide the computed period for oscillation of the level setting means whereby a predetermined operating characteristic is provided for said power failure detection circuit.

8. The power failure detection circuit according to claim 1 wherein said level detecting means comprises a relaxation oscillator in the presence of failure conditions.

9. The power failure detection circuit according to claim 8 wherein said voltage ratio comprises the ratio of the maximum voltage of said oscillator input to the minimum voltage of said oscillator input in the presence of failure conditions.

References Cited

UNITED STATES PATENTS

| | | | |
|---|---|---|---|
| 3,327,171 | 6/1967 | Lipnitz et al. | 317—36 |
| 3,440,491 | 4/1969 | Tenenbaum et al. | 317—36X |
| 3,444,434 | 5/1969 | Zocholl | 317—36 |

JAMES D. TRAMMELL, Primary Examiner

U.S. Cl. X.R.

317—33, 36, 142, 148.5; 340—248